(No Model.) 5 Sheets—Sheet 1.
P. J. TUNNY.
POTATO DIGGER.

No. 441,783. Patented Dec. 2, 1890.

Witnesses:
Spencer Ward
Frank Ward

Inventor:
Patrick J. Tunny
By Gilson & Benjamin
Attorneys.

(No Model.) 5 Sheets—Sheet 4.
P. J. TUNNY.
POTATO DIGGER.

No. 441,783. Patented Dec. 2, 1890.

Witnesses:
Spencer Ward
Frank Ward

Inventor:
Patrick J. Tunny
By Gillson & Benjamin
Attorneys.

(No Model.)  5 Sheets—Sheet 5.

P. J. TUNNY.
POTATO DIGGER.

No. 441,783. Patented Dec. 2, 1890.

Witnesses:
Spencer Ward
Frank Ward

Inventor:
Patrick J. Tunny
By Gillon & Benjamin
Attorneys.

UNITED STATES PATENT OFFICE.

PATRICK J. TUNNY, OF WHEATON, ILLINOIS.

POTATO-DIGGER.

SPECIFICATION forming part of Letters Patent No. 441,783, dated December 2, 1890.

Application filed January 20, 1890. Serial No. 337,489. (No model.)

*To all whom it may concern:*

Be it known that I, PATRICK J. TUNNY, a citizen of the United States, residing at Wheaton, in the county of Du Page and State of Illinois, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to potato-diggers. Its object is to provide an implement of the kind named which will be effective in its operation while being light of draft, and which will clean and assort the potatoes and deliver the various grades to suitable receptacles.

Figure 1:
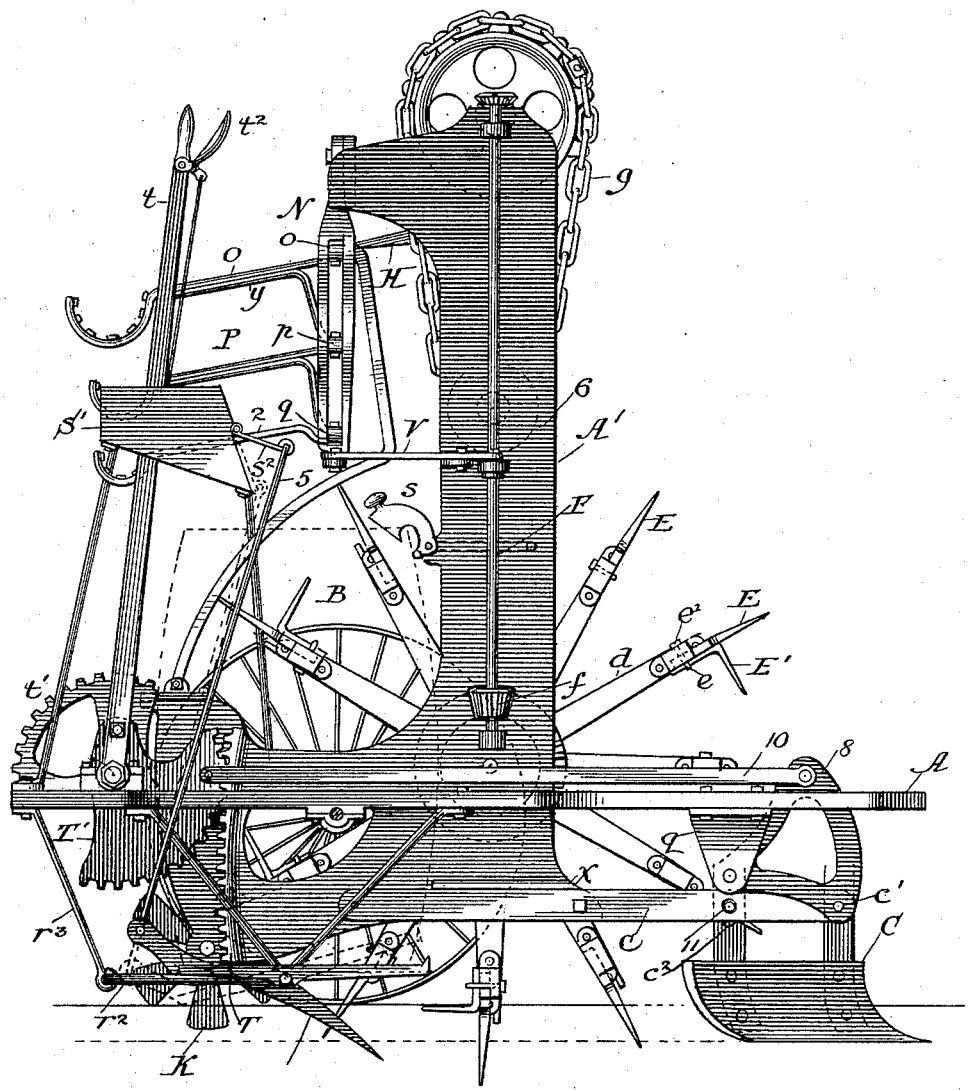
Figure 2:
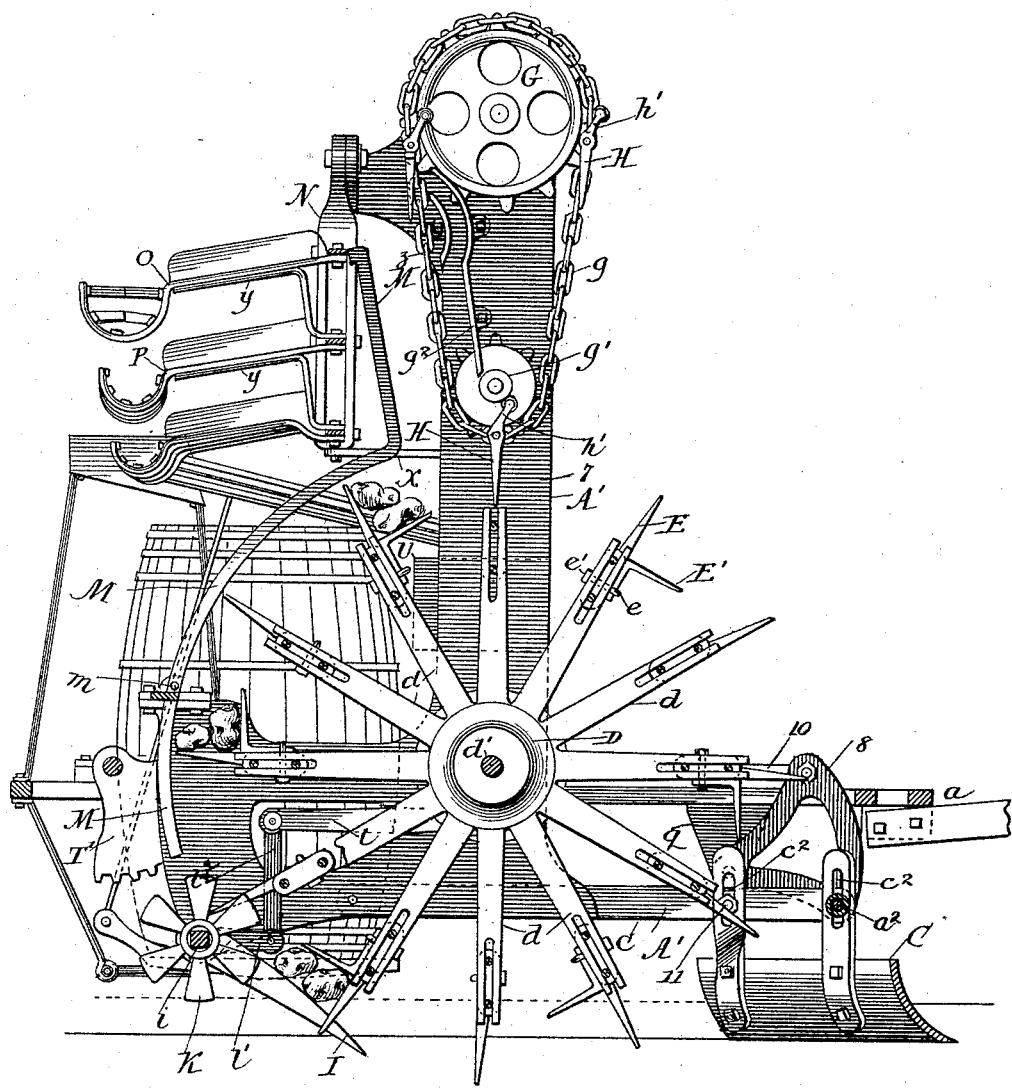
Figure 3:
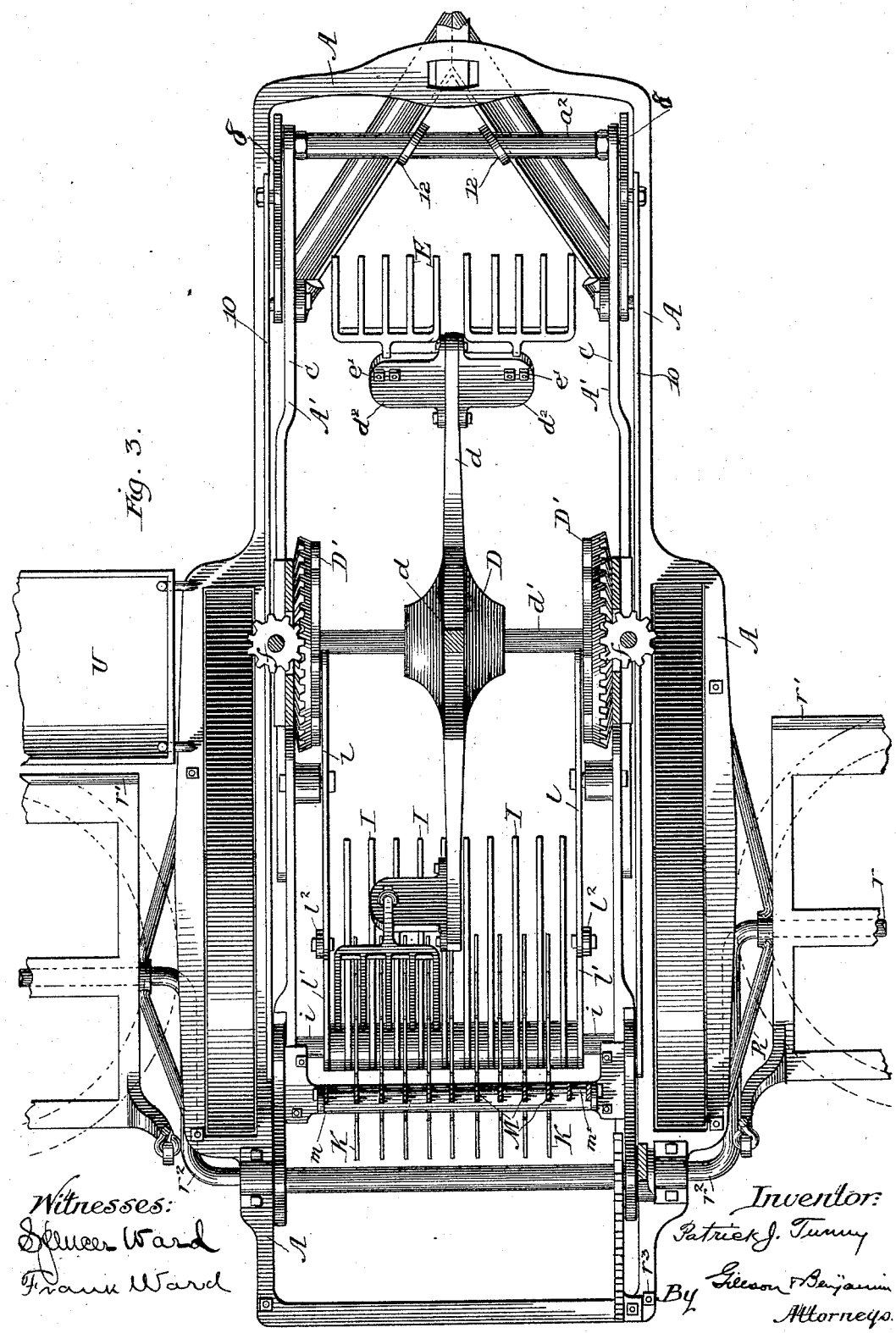
Figure 4:
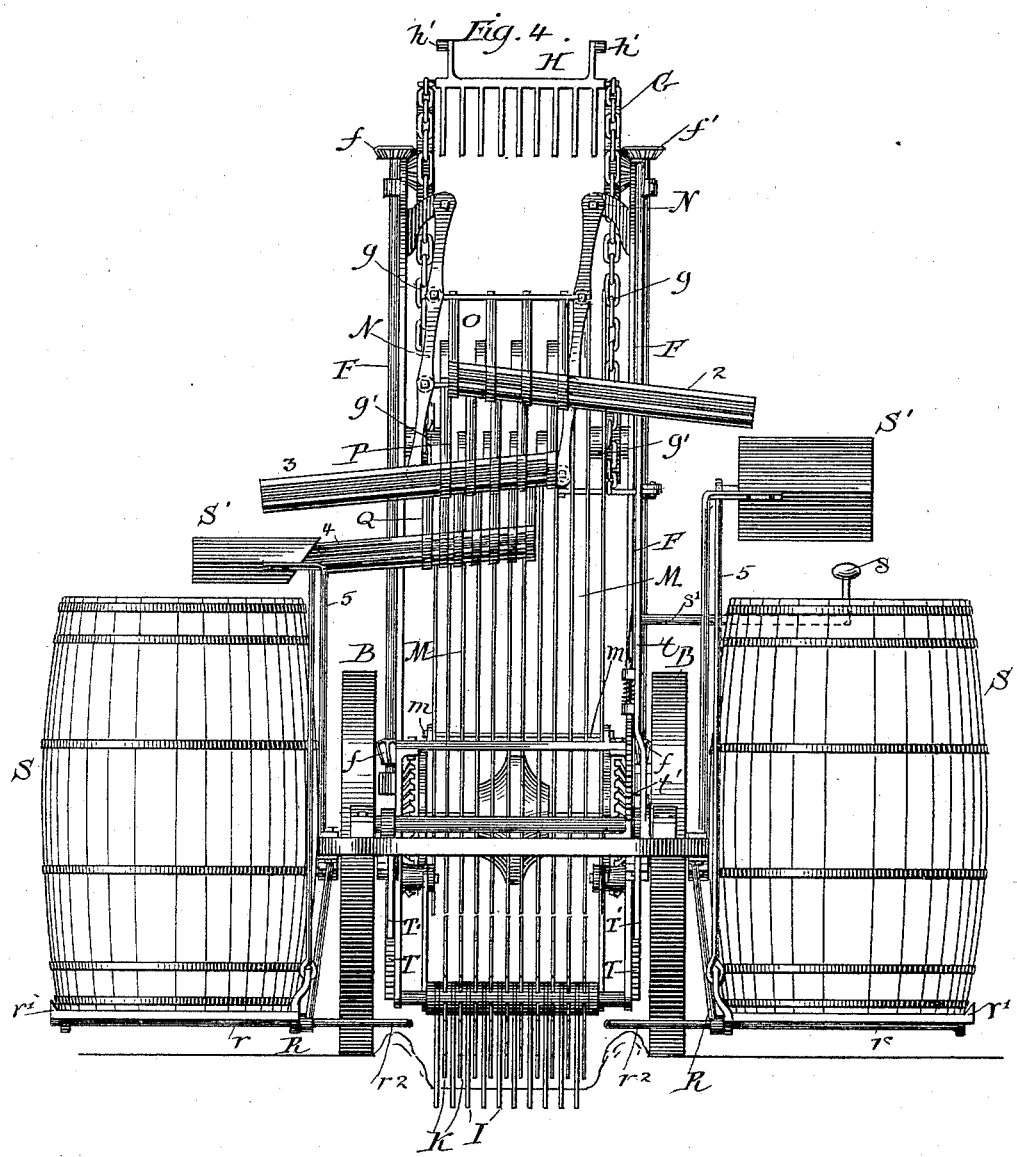
Figure 5:
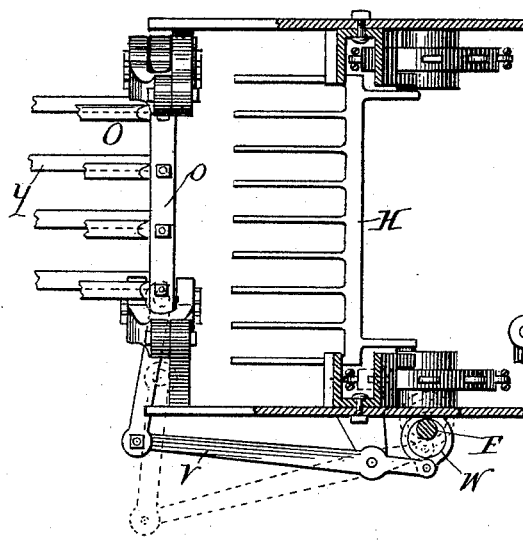
Figure 6:
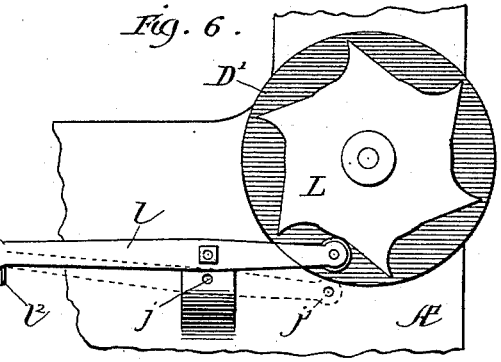
Figure 7:
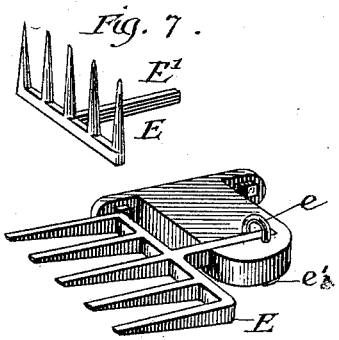
Figures 8, 9:
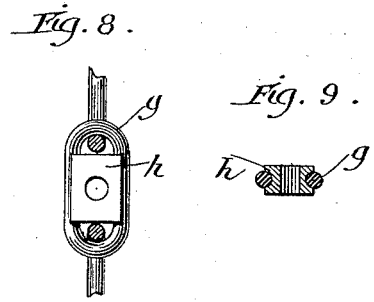
Figure 10:
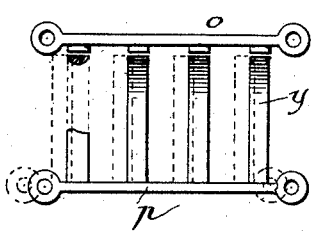
Figure 11:
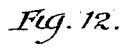
Figure 12:
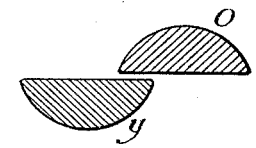

In the accompanying drawings, Figure 1 is a side elevation of the body of my improved potato-digger. Fig. 2 is a vertical longitudinal sectional view. Fig. 3 is a plan view. Fig. 4 is a rear elevation, various parts not being shown. Figs. 5 to 12, inclusive, are details.

My potato-digger is in the form of a vehicle, consisting of the frame A, mounted upon the carrying-wheels B B and adapted to be drawn by horses attached at $a$.

An upright frame A', consisting of the sides 6 and 7, is carried by the frame A through the agency of the bell-cranks 8 8 and toothed cams T'. The bell-cranks 8 8 are pivoted in lugs 9 9, depending from the sides of the frame A, near its forward end. The bell-cranks are pivotally attached at $c'$ to the bars $c$, which form a part of the frame A', being rigidly bolted to the uprights 6 7, each of which is cast with a shoulder to rest upon these bars. A rod 10 unites the other arm of the bell-cranks with the cams T'. The lower portions of the sides 6 7 of the frame A' extend backwardly, and are each provided with a rack T to engage the cams T' T', these racks being curved to correspond with the movement of the bell-cranks 8. The cams T' T' are controlled by a hand-lever $t$, which actuates the shaft upon which they are both journaled to the frame A. By the operation of these cams upon the racks T the rearward end of the frame A' is elevated, and by their action upon the bell-cranks 8 the forward end of said frame is correspondingly elevated. The frame A' is secured at any desired elevation by a locking device connected with the hand-lever $t$, consisting of a hand-piece $t^2$ in the form of a bell-crank, which by the action of a connecting-rod controls a pawl (partially shown in Fig. 4) engaging in the fixed teeth $t'$. A double-mold-board plow C is carried upon the forward ends of the bars $c$ and the cross-rod $a^2$ by suitable standards, which are provided with slots $c^2$, through which pass the bolts 11 and rod $a^2$, and by means of which the plow is vertically adjustable. As shown, the rod $a^2$ carries a gas-pipe sleeve in three sections for the purpose of securing the plow-standards 12, which are attached to this bar, the outer sections of the sleeve being controlled by nuts adjusted to screw-threads cut upon the rod.

Revolving between the sides 6 7 of the frame A' are a series of digging-forks E, carried upon the arms $d$, which are cast integrally with the hub D, mounted on the axle $d'$. Two of the forks E are carried by each arm and are attached thereto by means of the plates $d^2$, which are bolted to the arms. Forks E' are also carried by these revolving arms, their teeth being horizontal to those of the forks E. Both forks are secured to the plates $d^2$ by the staples $e$ and nuts $e'$. The axle $d'$ is journaled in the sides 6 7. The hub D and arms $d$ form a traction-wheel by which the working parts of the machine are actuated, the forks E providing the means of contact with the ground. If desired, this traction-wheel may be provided with a periphery at the outer ends of the arm $d$; but I prefer to make it as shown.

Bevel gear-wheels D' are mounted on the axle $d'$ near its ends and mesh with corresponding pinions $f$, mounted upon the vertical shafts F, which are journaled in bosses cast upon the outer surfaces of the sides 6 7. Suitable openings are provided in these side pieces to accommodate the pinions $f f$.

Upon the upper ends of the shafts F F are beveled gear-pinions $f' f'$, intermeshing with corresponding pinions upon the sprocket-wheels G G, which are carried by studs projecting inwardly from the sides 6 7. Adjusted to these sprocket-wheels are endless chain bands $g\ g$, which connect with the sprocket-wheels $g'\ g'$, carried in similar manner and directly below the wheels G G.

Extending between the two sides 6 7, and swinging loosely upon pivot-pins secured in links of the chain $g\ g$, are the elevating-forks H. The manner of securing these forks to the chains is shown in detail in Figs. 8 and 9, and consists in spreading the links to which they are directly attached to receive small blocks $h$, which have along two of their edges grooves, into which the sides of the links are pressed. Each of these blocks is provided with a hole to receive the pivot-pin. A spur $h'$ projects backwardly from each end of the forks H, and is preferably provided with a friction-roller, suitably mounted, as shown. Upon the sprocket-wheels $g'\ g'$ are concentric hubs, with which the spurs $h'\ h'$ come in contact. These spurs being inclined backwardly with reference to the direction of their movement, the effect of the contact with said hubs is to hold the fork H horizontal to the chain $g$ so long as the contact is continued. A flange $g^2$, bolted to the sides 6 7, extending upwardly from the hub of the wheel $g'$ and equidistant with it from the chain $g$, serves to continue the forks H in the horizontal position, the hub and flange acting together as a cam. The upper end of the flange $g^2$ is curved away from the chain $g$, so as to gradually release the fork and finally permit it to swing freely. As a precautionary measure, serviceable only in the event of faulty construction or when the parts become worn, a supplemental curved flange $z$ is placed upon the sides 6 7 opposite the curve of the flange $g^2$, whereby it is made impossible for the fork H to fall suddenly to a vertical position.

A rake consisting of the teeth I I, fitting upon the rectangular shaft $i$, projects forward and obliquely downward in such manner as to receive the potatoes as they are exhumed by the forks E, the teeth of the rake being so adjusted that the fork-teeth pass between them. The shaft $i$ is journaled in the sides 6 7, its ends being round for that purpose. A limited vertical motion is imparted to the teeth I by the action of the cams L, of ratchet form, upon the gear-wheels D', actuating the rocking lever $l$, which communicates its motion to the teeth I by means of the connecting-bar $l^2$ and the crank-arm $l'$, the latter being rigidly secured to the shaft $i$. This device is thrown out of gear by pivoting the rocking bar $l$ at $j$, and the teeth I are held rigid by bolting the end of the rocking bar to the frame A' at $j'$.

Cleaning-disks K, consisting of a number of blades held together by a hub, are mounted loosely upon the shaft $i$ alternately with the teeth I and revolve freely.

Extending upwardly from a point immediately above the disks K are a series of guide-bars M. From their lower extremities these bars describe the arc of a circle, whose center is the axle $d'$ and whose radius is just enough greater than the arms $d$ and forks E, so that the latter do not come in contact with said bars. At a point $x$, substantially at the level of the lower side of the sprocket-wheel $g'$ and several inches back of it, the bars M are turned upwardly and extend parallel to the plane of the upwardly-moving portions of the chains $g$, terminating opposite the curved portion of the flange $g^2$, their upper ends being bent backwardly. The bars M are held by the cross-bar $m$, which is firmly secured to the sides 6 7 and contributes to the strength of the frame A'. The bar $m$ is provided with transverse slots to receive the bars M. The latter are punctured immediately above the bar $m$ to receive the rod $m'$, which also passes through lugs upon the bar $m$, as shown in Fig. 3, and which secures the bars M rigidly.

Swinging transversely to the frame A' and back thereof from suitable shoulders at the upper ends of the sides 6 7 are the arms N N, connected by the cross-arms $o\ p\ q$, which move freely upon their retaining-bolts. A series of three inclined riddles O P Q are attached, respectively, to the arms $o\ p\ q$. These riddles consist of parallel bars whose outer ends are bent to form hooks to support the chutes 2, 3, and 4. A vibrating motion is imparted to these riddles by the rocking lever $v$, pivoted to one of the pendent arms N and fulcrumed in a boss cast upon the frame 6 and actuated by an eccentric $w$ on the shaft F. To facilitate the operation of riddling, supplemental bars $y\ y$ are adjusted immediately beneath the bars of the riddles O P, being attached, respectively, to the cross-arms $p\ q$. In operation these supplemental bars, being attached to the swinging frame farther from the centers from which the whole is swung than are the arms of the riddles with which they co-operate, travel a greater distance, and hence prevent the clogging of the riddles.

Barrels S S are carried on the tilting tables $r'\ r'$ at each side of the machine to receive, through the hoppers S' S' from the chutes 2 3, the merchantable potatoes. The tables $r'\ r'$ rest upon the rods $r$, which form a part of the frame R, which is secured to the frame A.

For greater strength the two frames R R are connected by the rod $r^2$ passing to the rear of the machine.

$r^3$ is one of the braces of the frame R.

The barrels S S are held in place by a hook $s$, carried upon a rod $s'$, projecting from the frame A', the hook being caught on the upper edge of the barrel.

The hoppers S' S', which are carried by standards upon the frame A, are provided with doors $s^2$, as shown in Fig. 1, which are controlled by the tilting tables $r'$ by means of the rod 5 and crank-arm $s^3$, secured to the tables. The relations of these parts are such that when the barrels are in position the hopper-doors are open, and when the tables are tilted to remove the barrels the doors are closed. The chute 4 is discharged into a box $u$, carried upon the side of the frame A.

The operation of my machine is as follows: The plow C, having been properly adjusted according to the variety of potatoes to be dug, removes the soil above the tubers, carrying with it vines and weeds. The forks E and teeth I penetrate the soil to the extreme depth at which potatoes are ever found, and by their combined action, the teeth of the forks passing between the rake-teeth I, all of the potatoes are gathered up. The disks K are rotated by the pressure against them of the load carried by the ascending fork and by their action pulverize the soil, so that it falls back. The forks E carry the potatoes to the point $x$, the lateral forks E' and guide-bars M serving to keep them on the forks. At $x$ one of the elevating-forks H lifts them from the fork E, carrying them to the top of the guide-bars M, where, by the tilting of the fork H by the action of the cam $g^2$, they are delivered to the riddle O, the larger ones being carried to the chute 2 and conveyed to one of the barrels, those of a smaller size being delivered to the other barrel, and those too small to market being discharged in the box $u$. As a barrel is filled, the operator releases it by lifting the hook, tilting the barrel backwardly until its chine is caught by the ground, and the machine moves on and leaves it. As already explained, the tilting of the barrel closes the hopper, so that the potatoes accumulate in it until another barrel is adjusted to the machine. In turning the machine at the side of the field or in transporting it the working parts are elevated by means of the hand-lever $t$ in the manner described. The vertical movement of the teeth I facilitates the separation of the soil; but that movement is especially provided in order to temporarily lessen the draft when digging potatoes from hills or transversely to the rows. In digging potatoes which are in rows and running the machine with the rows the digging-teeth should be fixed.

My improved potato-digger unites a high degree of efficiency with great simplicity of mechanism. The parts are all light, as but little strain is sustained by them. The draft is easy, because no unnecessary work—such as the scraping up of large quantities of soil—is done; but one man is needed to operate the machine, as no heavy lifting is required, provision being made for removing the barrels as filled without stopping the machine.

I claim—

1. The combination, substantially as described, of the revolving digging-forks and an independent set of digging-teeth, with the cleaning-disks K, revolving loosely upon a shaft.

2. In a potato-digging machine having revolving digging-forks and an independent set of digging-teeth, the combination therewith of a series of guide-bars and a set of assorting-riddles, substantially as described, and for the purpose set forth.

3. The combination, in a potato-digging machine, of a set of revolving digging-forks, an independent set of exhuming-teeth, and a series of guide-bars, the digging-forks carrying lateral retaining-forks, substantially as described.

4. In a potato-digging machine, the combination, with revolving digging and elevating forks and a series of guide-bars and assorting-riddles, of a series of supplementary elevating-forks carried by endless chains and operating between the revolving forks and the riddles, substantially as described, and for the purposes set forth.

5. In a potato-harvesting machine having a supporting-frame and revolving digging-forks carried thereby, the combination, with said parts, of an elevating device comprising a series of swinging forks having backwardly-projecting spurs, a pair of endless chains for carrying said forks, and sprocket-wheels for carrying said chains, and cams attached to the supporting-frame for engaging the spurs of the elevating-forks, whereby said forks are held in a horizontal position on their upward movement, substantially as described, and for the purposes set forth.

6. In a riddling or separating device consisting of swinging pendants, cross-arms pivoted thereto, and a series of parallel riddling-bars fixed to said cross-arms, the combination, with said parts, of dislodging-bars located immediately below the riddling-bars and being fixed to cross-arms pivotally attached to the pendants more remote from their point of support than the cross-arms carrying the adjacent riddling-bars, substantially as described, and for the purposes set forth.

7. In a potato-digging machine, the combination, substantially as described, of a set of assorting-riddles, consisting of swinging pendants, cross-arms pivotally attached thereto, a series of parallel riddling-bars fixed to said cross-arms, and a series of dislodging-bars located immediately below the riddling-bars and fixed upon cross-arms pivoted to swinging pendants more remote from their point of support than the cross-arms carrying the adjacent riddling-bars.

8. In a potato-digging machine having a traction-wheel, the combination, with a riddling device comprising a series of parallel riddling-bars and a series of parallel dislodging-bars located immediately below the riddling-bars, of a rocking lever V for communicating motion to said riddling device, a shaft F, rotated by means of gear-connection with the traction-wheel, and an eccentric mounted upon the shaft for communicating the rocking motion to the lever, substantially as described, and for the purposes set forth.

9. In a potato-digging machine, the combination, with the supporting-frame, of tilting tables adapted to carry the receptacles for the potatoes, substantially as described, and for the purposes set forth.

10. In a potato-digging machine, the combination, with the exhuming devices and assorting-riddles, of suitable potato-receptacles, tilting tables for carrying such receptacles, and means for securing the tables and receptacles, substantially as described, and for the purposes specified.

11. In a potato-digging machine, the combination, with the potato-receptacles and with tilting tables for carrying the same, of conveying-hoppers having discharge-doors controlled by the tilting carrying-tables, substantially as described, and for the purpose set forth.

12. In a potato-digging machine, the combination, with the supporting-frame and its carrying-wheels, of a vertically-adjustable frame, a traction-wheel, exhuming-forks, and an uncovering-plow, all carried by such adjustable frame, substantially as described, and for the purpose set forth.

13. In a potato-digging machine having its traction and digging devices carried by a vertically-adjustable frame and having a supporting-frame mounted on carrying-wheels, the combination, with such parts, of an adjusting device consisting of toothed cams carried by the supporting frame, racks attached to the adjustable frame and intermeshing with said cams, bell-cranks pivoted to said supporting and adjustable frames remote from said cams, and connecting-rods uniting the cams with the bell-cranks, and means for controlling and locking said cams, substantially as described, and for the purpose set forth.

14. In a potato-digging machine, the combination, with a traction-wheel, of a set of digging-teeth fixed upon a journaled shaft, cams carried upon the shaft of the traction-wheel, and rocking levers actuated by such cams and connected with the shaft of the digging-teeth by means of suitable crank-arms and connecting-rods, the digging-teeth being thereby alternately raised and depressed by the action of said cams, substantially as described, and for the purposes set forth.

In testimony whereof I affix my signature in presence of two witnesses.

PATRICK J. TUNNY.

Witnesses:
W. M. RAGSDALE,
L. GUSTAFSON.